(12) United States Patent
Timm et al.

(10) Patent No.: US 9,715,266 B2
(45) Date of Patent: *Jul. 25, 2017

(54) ATTENTION-BASED RENDERING AND FIDELITY

(71) Applicant: SONY INTERACTIVE ENTERTAINMENT AMERICA LLC, San Mateo, CA (US)

(72) Inventors: Paul Timm, San Diego, CA (US); Andres Ramos Cevallos, San Diego, CA (US); Ryan Halvorson, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,275

(22) Filed: Jun. 13, 2016

(65) Prior Publication Data

US 2016/0291674 A1 Oct. 6, 2016

Related U.S. Application Data

(63) Continuation of application No. 14/014,199, filed on Aug. 29, 2013, now Pat. No. 9,367,117.

(51) Int. Cl.
*G06F 1/32* (2006.01)
*G09G 5/36* (2006.01)
(Continued)

(52) U.S. Cl.
CPC .......... *G06F 1/3231* (2013.01); *G06F 1/3265* (2013.01); *G06F 3/013* (2013.01);
(Continued)

(58) Field of Classification Search
None
See application file for complete search history.

(56) References Cited

U.S. PATENT DOCUMENTS 9,367,117 B2* 6/2016 Timm ................... G06F 1/3231
2007/0024579 A1* 2/2007 Rosenberg .............. G06F 3/013
345/156

(Continued)

FOREIGN PATENT DOCUMENTS

CN 104423575 A 3/2015
JP H04-302381 10/1992
(Continued)

OTHER PUBLICATIONS

PCT Application No. PCT/US2014/047310 International Search Report and Written Opinion dated Nov. 12, 2014.
(Continued)

*Primary Examiner* — Joseph Haley
*Assistant Examiner* — Emily Frank
(74) *Attorney, Agent, or Firm* — Polsinelli LLP

(57) ABSTRACT

Methods and systems for attention-based rendering on an entertainment system are provided. A tracking device captures data associated with a user, which is used to determine that a user has reacted (e.g., visually or emotionally) to a particular part of the screen. The processing power is increased in this part of the screen, which increases detail and fidelity of the graphics and/or updating speed. The processing power in the areas of the screen that the user is not paying attention to is decreased and diverted from those areas, resulting in decreased detail and fidelity of the graphics and/or decreased updating speed.

16 Claims, 5 Drawing Sheets

(51) Int. Cl.
*G06F 3/01* (2006.01)
*G09G 5/391* (2006.01)

(52) U.S. Cl.
CPC ............ *G06F 3/015* (2013.01); *G09G 5/363* (2013.01); *G09G 5/391* (2013.01); *G09G 2330/021* (2013.01); *G09G 2340/0407* (2013.01); *G09G 2354/00* (2013.01); *Y02B 60/1242* (2013.01); *Y02B 60/1289* (2013.01)

(56) References Cited

U.S. PATENT DOCUMENTS

| | | | |
|---|---|---|---|
| 2008/0111833 A1 | 5/2008 | Thorn et al. | |
| 2008/0169930 A1 | 7/2008 | Mallinson | |
| 2010/0079508 A1* | 4/2010 | Hodge | G06F 3/013 345/697 |
| 2010/0231504 A1 | 9/2010 | Bloem et al. | |
| 2010/0302219 A1* | 12/2010 | Kitashou | G06F 3/1431 345/204 |
| 2011/0013007 A1* | 1/2011 | Holmberg | A61B 3/113 348/78 |
| 2012/0288139 A1 | 11/2012 | Singhar | |
| 2013/0152014 A1* | 6/2013 | Rabii | G06F 3/0485 715/785 |
| 2014/0204016 A1* | 7/2014 | Plowman | G06F 1/3231 345/156 |
| 2014/0313120 A1* | 10/2014 | Kamhi | G06K 9/00604 345/156 |
| 2015/0042553 A1* | 2/2015 | Mecham | G09G 3/003 345/156 |
| 2015/0061989 A1 | 3/2015 | Timm | |
| 2015/0116364 A1* | 4/2015 | Aurongzeb | G06F 3/0487 345/659 |
| 2015/0268719 A1* | 9/2015 | Li | G06F 3/013 345/156 |

FOREIGN PATENT DOCUMENTS

| | | |
|---|---|---|
| JP | H09-081309 | 3/1997 |
| JP | 2012-146210 | 8/2012 |
| JP | 2016-536699 | 11/2016 |
| WO | WO 2013/036236 | 3/2013 |
| WO | WO 2013/080444 | 6/2013 |
| WO | WO 2015/030949 | 3/2015 |

OTHER PUBLICATIONS

U.S. Appl. No. 14/014,199; Final Office Action mailed Sep. 15, 2015.
U.S. Appl. No. 14/014,199; Office Action mailed Apr. 13, 2015.
Japanese Patent Application No. 2016-538922 Notification of Reasons for Refusal dated Aug. 9, 2016.
Guenter et al., Brian; "Foveated 3D graphics", ACM Transactions on Graphics, vol. 31, No. 6. Nov. 1, 2012.
European Patent Application No. 14840294.4 Extended European Search Report dated Apr. 10, 2017.

* cited by examiner

300

300

310

ATTENTION-BASED RENDERING AND FIDELITY

CROSS-REFERENCE TO RELATED APPLICATIONS

This application is a continuation and claims the priority benefit of U.S. patent application Ser. No. 14/014,199 filed Aug. 29, 2013, the disclosure of which is incorporated herein by reference.

BACKGROUND OF THE INVENTION

Field of the Invention

This invention relates generally to electronic systems and more particularly to a system and method for utilizing tracking to identify reactions to content.

Description of the Related Art

In electronic systems, particularly entertainment and gaming systems, a user typically controls the behavior or actions of at least one character in a game program. The users' perspective, as determined by the camera angle, varies depending on a variety of factors, including hardware restrictions, such as the processing power of the system. In games with two-dimensional graphics, typical user perspectives include a top-down view (or "helicopter" view), where the user views the game from a third-person perspective, and a side-scrolling view, where the user views the characters from a third-person perspective as they move across the screen from left to right. These perspectives require lower levels of detail, and thus, require lower processing power from the processing units of the system.

In games with three-dimensional graphics, typical user views include a fixed 3D view, where the objects in the foreground are updated in real time against a static background, and the perspective of the user remains fixed, a first-person view (i.e., the user views the game from the perspective of a game character), and third-person view, where the user views the game character from a distance away from the game character, such as above or behind the character. The views depend on the sophistication of the camera system of a game. Three types of camera systems are typically used: a fixed camera system, a tracking camera system that follows the game character, and an interactive camera system that allows the user to control the camera angle.

Although the three-dimensional perspectives are more realistic for the user, they require more processing power, and, thus, the level of detail in rendering can suffer as a result of the drain in processing power to create the three-dimensional view.

Therefore, there is a need for a system and method for improving the balance between providing rendering detail and conservation of processing power by tracking where the user focuses his attention during game play.

SUMMARY OF THE CLAIMED INVENTION

Embodiments of the present invention provide methods and systems for attention-based rendering on an entertainment system are provided. A tracking device captures tracking data associated with a user. The tracking data is utilized to determine that the user reacted to at least one area displayed on a display device connected to the entertainment system. A processor communicates the determination to a graphics processing unit and instructs it to alter the processing power used for rendering graphics in the area of the display device. If the user is paying attention to the area, the processing power is increased, which in turn increases the detail and fidelity of the graphics and/or increases the speed with which objects within the area are updated. If the user is not paying attention to the area, processing power is diverted from the area, resulting in decreased detail and fidelity of the graphics and/or decreased updating speed of the objects within the area.

Various embodiments of the present invention include methods for attention-based rendering on an entertainment system. Such methods may include receiving tracking data from at least one user by a tracking device, wherein the tracking data is captured in response to a reaction of the user to at least one area displayed on a display device. The tracking data is sent by way of the tracking device to a processor. The processor executes instructions stored in memory, wherein execution of the instructions by a processor utilizes the tracking data to determine that the user reacted to the at least one area and communicates to a graphics processing unit to alter processing power used for rendering graphics. A further embodiment includes the steps of receiving a selection by the user indicating a preference for initiating a power-saving mode, storing the selection in memory, and initiating a power-saving mode when the tracking data indicates a lack of attention to the display device by the user.

Further embodiments include systems for attention-based rendering. Such systems may include a memory and a display device connected to an entertainment system. A tracking device captures tracking data associated with a user. A processor executes instructions stored in memory, wherein execution of the instructions by the processor utilizes the tracking data to determine that the user reacted to the at least one area displayed on the display device and communicates to a graphics processing unit to alter processing power used for rendering graphics.

Some embodiments of the present invention further include computer-readable storage media having embodied thereon programs executable by processors to perform methods for attention-based rendering.

DETAILED DESCRIPTION

Figure 1:
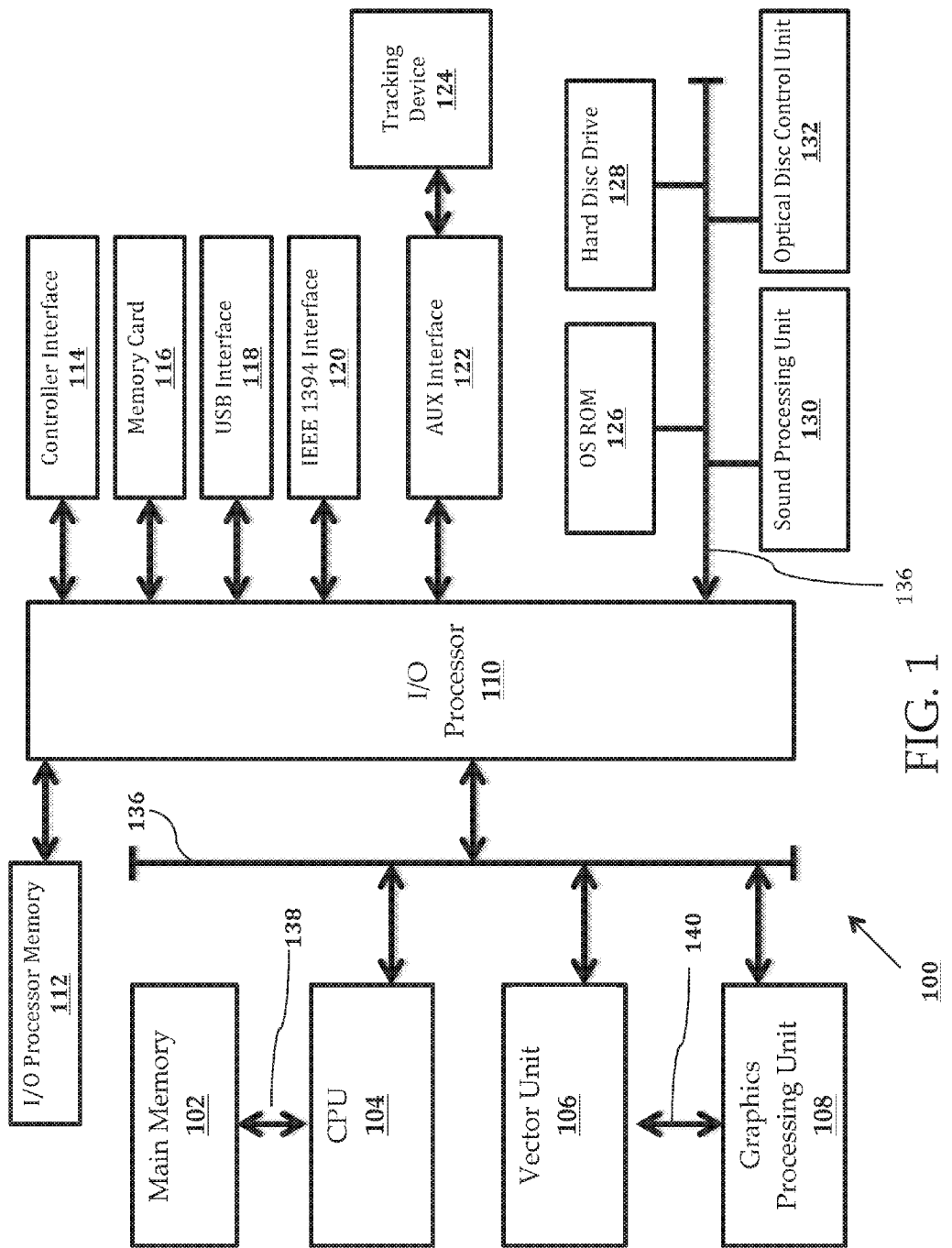
FIG. 1 is a block diagram of an exemplary electronic entertainment system.

FIG. 1 is a block diagram of an exemplary electronic entertainment system 100. The entertainment system 100 includes a main memory 102, a central processing unit (CPU) 104, at least one vector unit 106, a graphics processing unit 108, an input/output (I/O) processor 110, an I/O processor memory 112, a controller interface 114, a memory card 116, a Universal Serial Bus (USB) interface 118, and an IEEE 1394 interface 120, an auxiliary (AUX) interface 122 for connecting a tracking device 124, although other bus standards and interfaces may be utilized. The entertainment system 100 further includes an operating system read-only memory (OS ROM) 126, a sound processing unit 128, an optical disc control unit 130, and a hard disc drive 132, which are connected via a bus 134 to the I/O processor 110. The entertainment system 100 further includes at least one tracking device 124.

The tracking device 124 may be a camera, which includes eye-tracking capabilities. The camera may be integrated into or attached as a peripheral device to entertainment system 100. In typical eye-tracking devices, infrared non-collimated light is reflected from the eye and sensed by a camera or optical sensor. The information is then analyzed to extract eye rotation from changes in reflections. Camera-based trackers focus on one or both eyes and records their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimension. This system employs a variant of image-based three-dimensional reconstruction.

The tracking device 124 may include a microphone integrated into or attached as a peripheral device to entertainment system 100 that captures voice data. The microphone may conduct acoustic source localization and/or ambient noise suppression.

Alternatively, tracking device 124 may be the controller of the entertainment system. The controller may use a combination of built-in accelerometers and infrared detection to sense its position in 3D space when pointed at the LEDs in a sensor nearby, attached to, or integrated into the console of the entertainment system. This design allows users to control a game with physical gestures as well as button-presses. The controller connects to the console using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

Preferably, the entertainment system 100 is an electronic gaming console. Alternatively, the entertainment system 100 may be implemented as a general-purpose computer, a set-top box, or a hand-held gaming device. Further, similar entertainment systems may contain more or less operating components.

The CPU 104, the vector unit 106, the graphics processing unit 108, and the I/O processor 110 communicate via a system bus 136. Further, the CPU 104 communicates with the main memory 102 via a dedicated bus 138, while the vector unit 106 and the graphics processing unit 108 may communicate through a dedicated bus 140. The CPU 104 executes programs stored in the OS ROM 126 and the main memory 102. The main memory 102 may contain pre-stored programs and programs transferred through the I/O Processor 110 from a CD-ROM, DVD-ROM, or other optical disc (not shown) using the optical disc control unit 132. The I/O processor 110 primarily controls data exchanges between the various devices of the entertainment system 100 including the CPU 104, the vector unit 106, the graphics processing unit 108, and the controller interface 114.

The graphics processing unit 108 executes graphics instructions received from the CPU 104 and the vector unit 106 to produce images for display on a display device (not shown). For example, the vector unit 106 may transform objects from three-dimensional coordinates to two-dimensional coordinates, and send the two-dimensional coordinates to the graphics processing unit 108. Furthermore, the sound processing unit 130 executes instructions to produce sound signals that are outputted to an audio device such as speakers (not shown).

A user of the entertainment system 100 provides instructions via the controller interface 114 to the CPU 104. For example, the user may instruct the CPU 104 to store certain game information on the memory card 116 or instruct a character in a game to perform some specified action.

Other devices may be connected to the entertainment system 100 via the USB interface 118, the IEEE 1394 interface 120, and the AUX interface 122. Specifically, a tracking device 124, including a camera or a sensor may be connected to the entertainment system 100 via the AUX interface 122, while a controller may be connected via the USB interface 118.

Figure 2:
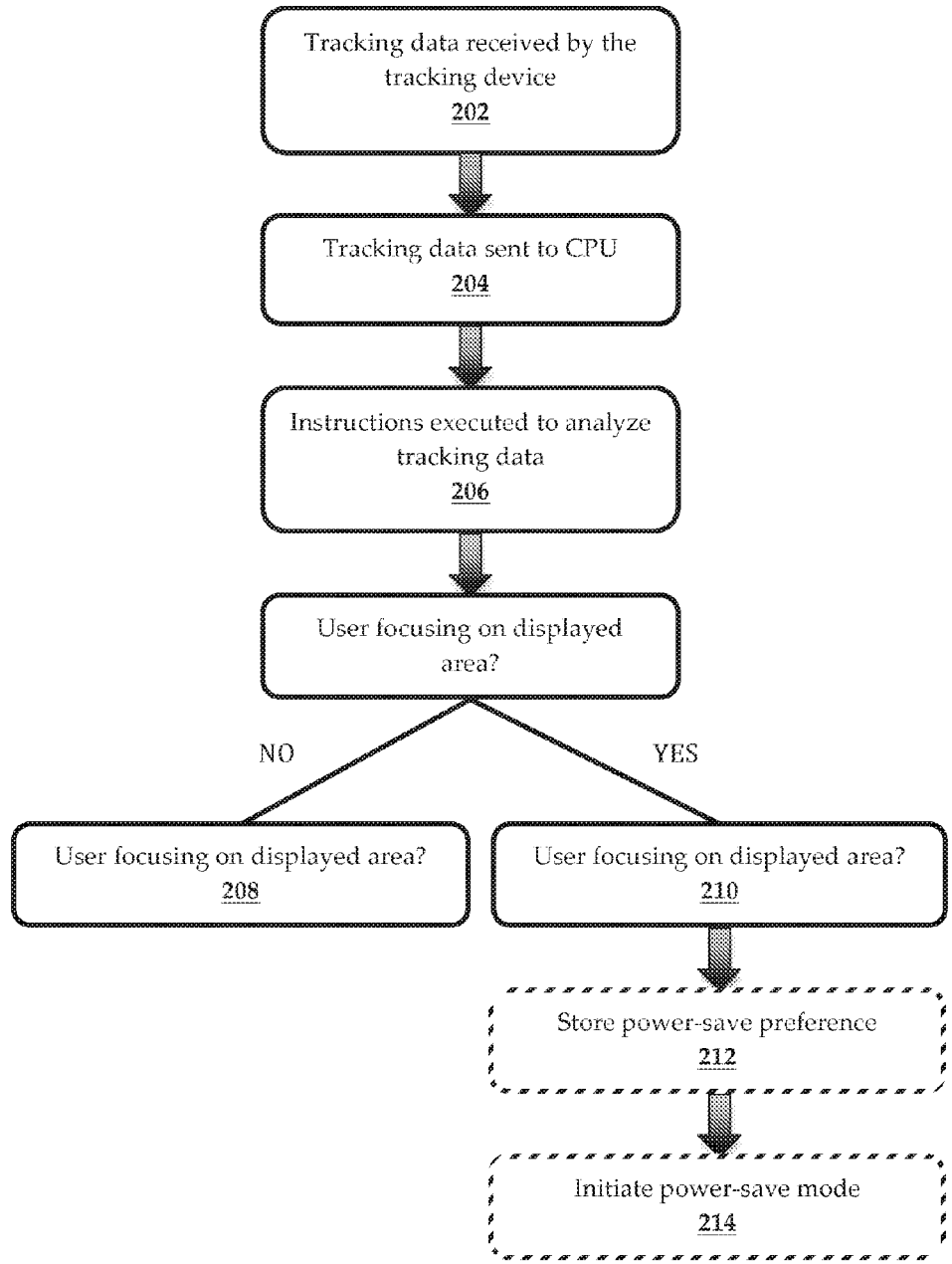
FIG. 2 is a flowchart of method steps for utilizing tracking to identify reactions to content.

FIG. 2 is an exemplary flowchart 200 for utilizing tracking to identify user reactions to content. In step 202, tracking data is received from the at least one user by the tracking device that is captured in response to a reaction of a user to at least one area displayed on the display device. The tracking data may be based on any type of tracking methodology, including but not limited to gesture-based tracking using a sensor and a range camera or a controller containing an accelerometer and infrared detection, eye tracking using a specialized camera or optical sensor using infrared light, audio-based tracking using an audio sensor or a microphone, and/or biometric tracking using a controller containing biometric sensors. In step 204, the tracking data is sent by the tracking device to the CPU 104 (FIG. 1).

In step 206, the CPU 104 executes a software module stored in main memory 102 (FIG. 1) with instructions to utilize the tracking data to determine the reaction of the user to the at least one area displayed on the display device. The software module may be custom-made for different game titles, or it may be native to the gaming platform. Alternatively, the software module may have different tracking functionalities for different types of interfaces (e.g., audio tracking, video tracking, or gesture tracking). The software module may also be installed into main memory 102 by way of a digital data storage device (e.g., an optical disc) being inserted into entertainment system 100 using optical disc control unit 132. The reaction may be a visual reaction, determined by, for example, movement of the eyes of the user toward or away from the area. The visual reaction may be captured by an integrated or peripheral camera connected to entertainment system 100. Alternatively, the reaction may be an emotional reaction by the user. An emotional reaction may include, for example and limited to, a vocal reaction by the user captured by a microphone, or a biometric reaction captured by the controller interface 114 (FIG. 1). An emotional reaction may occur, for example, when a user is surprised by an event occurring within the game (e.g., the user shouts or exclaims), or when a user is frightened or anxious because his game character is in danger (e.g., the user sweats or his pulse increases).

In step 208, when the user reaction indicates that the user is focusing his attention on the area of the display on the display device, the CPU 104 communicates with the main memory 102 (FIG. 1) and instructs the graphics processing unit 108 (FIG. 1) to increase processing power to render greater detail and fidelity in that area and/or to increase the speed with which objects within the area are updated in real-time.

Alternatively, in step 210, when the user reaction indicates that the user is not focusing his attention on the area of the display, the CPU 104 communicates with the main memory 102 and instructs the graphics processing unit 108 (FIG. 1) to decrease processing power to render detail and fidelity in that area and/or to decrease the speed with which objects within the area are updated in real-time.

Thus, greater processing power is diverted to areas of the display on the display device where the user is focusing most of his attention. For example, when a special effect is displayed on the display device, the user is likely to focus attention on the area of the screen in which the special effect is occurring. Meanwhile, areas of the display that the user is not focusing on (e.g., when these areas are only in the peripheral vision of user), less detail is needed and, therefore, less processing power is needed for rendering graphics. This allows the entertainment system to conserve processing power in areas that are not the focus of the attention of the user, and improve the graphical details of areas on which the user is currently focusing.

In another embodiment of the present invention, at step 212, the user may optionally select a power-saving preference in a preference module. The CPU 104 (FIG. 1) executes the preference module and instructs it to receive the selection by the user and store it in main memory 102 (FIG. 1) of the entertainment system 100. When selected, the power-saving preference initiates, at step 214, a power-saving mode when the tracking data indicates a lack of attention to the display device by a user. The power-saving mode may include, for example and not by way of limitation, initiation of a screen saver on the display device. Alternatively, the power-saving mode may require the entertainment system 100 to shut down.

Figure 3A:
FIG. 3A is a screenshot of an exemplary entertainment system environment showing a standard level of detail.
Figure 3B:
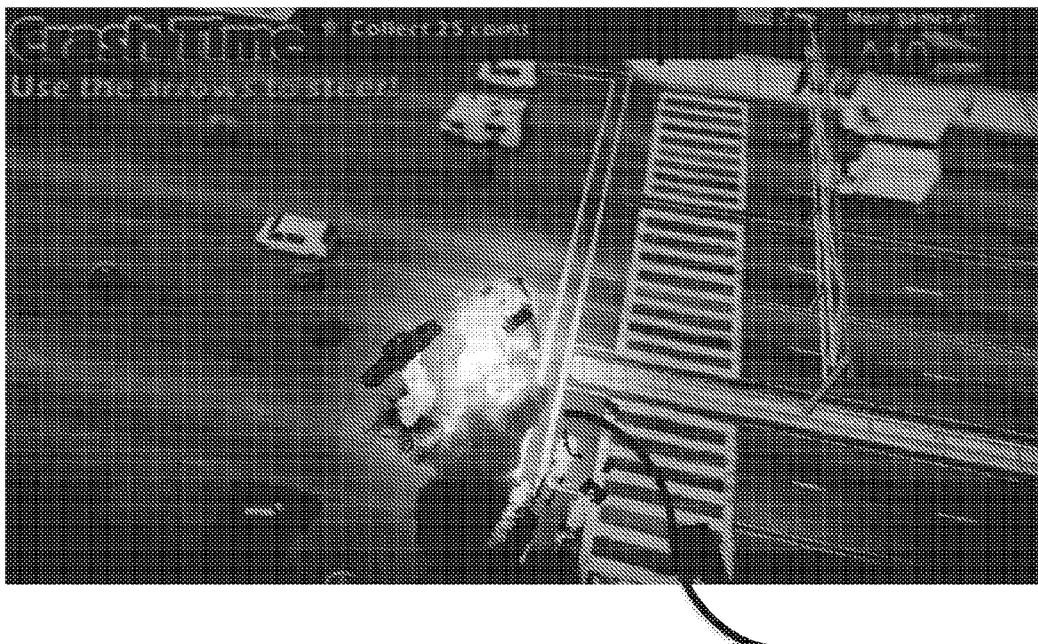
FIG. 3B is a screenshot of an exemplary entertainment system environment showing a low level of detail in areas in which a user is not focusing attention.
Figure 3C:
FIG. 3C is a screenshot of an exemplary entertainment system environment showing a high level of detail in areas in which a user is focusing attention.

FIGS. 3A-3C illustrate exemplary interfaces for transferring a ticket from one party to another on a mobile device, where both parties have access to and accounts with the same ticketing application.

Referring now to FIG. 3A, a screenshot of an exemplary entertainment system environment 300 showing a standard level of detail is shown, which may occur in a game on an entertainment system that does not employ a tracking device. In this environment, no additional detail is added or diminished because no processing power has been diverted to a certain area of the screen based on the attention of the user.

FIG. 3B is a screenshot of environment 300, showing a low level of detail in areas in which a user is not focusing attention. The focus area 310 is identified by the tracking device as the area on which the user is focusing. Focus area 310 has a normal level of detail, such as that shown in FIG. 3A. The remainder of the environment 300 has diminished detail because processing power has been diverted from these areas, which are likely only visible in the peripheral vision of the user. Therefore, a lower level of rendering is necessary.

FIG. 3C is a screenshot of environment 300 showing a high level of detail in areas in which a user is focusing attention. Focus area 310 has a higher level of detail because the processing power has been diverted from the remainder of the screen because the tracking device has recognized that the user is focusing attention only on focus area 310. An event, such as the vehicle crash visible in focus area 310, is one example of an event in a gaming environment that may draw the attention of the user to a particular area of a screen. Thus, a higher level of rendering is necessary in an area such as focus area 310 to improve the gaming experience for the user.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for managing processing power for a display, comprising:
generating a display for the single display screen of a display device, wherein the generated display includes one or more events that occur at pre-determined periods of time;
capturing tracking data in response to changes in biometric data associated with at least one user while the user is viewing one or more events that occurred on the generated display, wherein the tracking data is captured via sensors associated with a controller usable by the user to interact with the display device; and
executing instructions stored in memory, wherein execution of the instructions by a processor:
identifies at least one event displayed on the display screen that occurred near the time the tracking data was captured, wherein the identified event corresponds to one of the events to which the user reacted as indicated by the changes in biometric data, and
generates instructions for a graphics processing unit to alter processing power used for rendering graphics on the display device with reference to the identified.

2. The method of claim 1, wherein processing power is increased to render greater detail and graphical fidelity in an area corresponding to the identified event.

3. The method of claim 1, wherein processing power is increased in an area corresponding to the identified event in order to increase a speed by which objects within the area are updated.

4. The method of claim 1, wherein processing power is decreased in an area not corresponding to the identified event thereby reducing the detail or graphical fidelity in the area not corresponding to the identified event or reducing a speed by which objects within the area are updated.

5. The method of claim 1, further comprising identifying that the changes in biometric data correspond to a predetermined response associated with instructions to the graphics processing unit for altering processing power used for rendering graphics based on the identified response corresponding to the changes in biometric data.

6. A non-transitory computer-readable storage medium having embodied thereon a program, the program being executable by a processor to perform a method for managing processing power for a display, comprising:
generating a display for the single display screen of a display device, wherein the generated display includes one or more events that occur at pre-determined periods of time;
capturing tracking data in response to changes in biometric data associated with at least one user while the user is viewing one or more events that occurred on the generated display, wherein the tracking data is captured via sensors associated with a controller usable by the user to interact with the display device;
identifying at least one event displayed on the display screen that occurred near the time the tracking data was captured, wherein the identified event corresponds to one of the events to which the user reacted as indicated by the changes in biometric data; and
generating instructions for a graphics processing unit to alter processing power used for rendering graphics on the display device with reference to the identified event.

7. The non-transitory computer-readable storage medium of claim 6, wherein processing power is increased to render greater detail and graphical fidelity in an area corresponding to the identified event.

8. The non-transitory computer-readable storage medium of claim 6, wherein processing power is increased in an area corresponding to the identified event in order to increase a speed by which objects within the area are updated.

9. The non-transitory computer-readable storage medium of claim 6, wherein processing power is decreased in an area not corresponding to the identified event thereby reducing the detail or graphical fidelity in the area not corresponding to the identified event or reducing a speed by which objects within the area are updated.

10. The non-transitory computer-readable storage medium of claim 6, further comprising executable instructions for identifying that the changes in biometric data correspond to a predetermined response associated with instructions to the graphics processing unit for altering processing power used for rendering graphics based on the identified response corresponding to the changes in biometric data.

11. A system for attention-based rendering, the system comprising:
a memory;
a display device having a single display screen,
a graphics processing unit that generates one or more events that occur at pre-determined period of time, wherein the generated one or more events are displayed on the single display screen;
a tracking device comprising a controller that includes sensors, wherein the tracking device captures tracking data in response to changes in biometric data associated with the user, and wherein the changes in biometric data occurring while the user is viewing one or more events displayed on the single display screen;
a processor for executing instructions stored in memory, wherein execution of the instructions by the processor:
identifies the at least one event displayed on the display screen that occurred near the time the tracking data was captured, wherein the identified event corresponds to one of the events to which the user reacted as indicated by the changes in biometric data, and
generates instructions for a graphics processing unit to alter processing power used for rendering graphics on the display device with reference to the identified event.

12. The system of claim 11, wherein processing power is increased to render greater detail and graphical fidelity in an area corresponding to the identified event.

13. The system of claim 11, wherein processing power is increased in an area corresponding to the identified event in order to increase a speed by which objects within the area are updated.

14. The system of claim 11, wherein processing power is decreased in an area not corresponding to the identified event thereby reducing the detail or graphical fidelity in the area not corresponding to the identified event or reducing a speed by which objects within the area are updated.

15. The system of claim 11, wherein the processor further executes instructions to identify that the changes in biometric data correspond to a predetermined response associated with instructions to the graphics processing unit for altering processing power used for rendering graphics based on the identified response corresponding to the changes in biometric data.

16. A method for managing processing power for a display, comprising:
generating a display for the single display screen of a display device, wherein the generated display includes one or more events that occur at pre-determined periods of time;
capturing tracking data in response to changes in biometric data associated with at least one user in response to at least one event occurring on the generated display; and
executing instructions stored in memory, wherein execution of the instructions by a processor generates instructions for a graphics processing unit to alter processing power used for rendering graphics on the display device with reference to the event to which the user reacted as indicated by the changes in biometric data, wherein processing power is increased to render greater detail and graphical fidelity in an area corresponding to the event.

* * * * *